No. 621,009. Patented Mar. 14, 1899.
G. O. WOOLLEY.
MANUFACTURE OF CONICAL SHAPED PAPER BAGS.
(Application filed Dec. 30, 1897.)
(No Model.) 8 Sheets—Sheet 1.
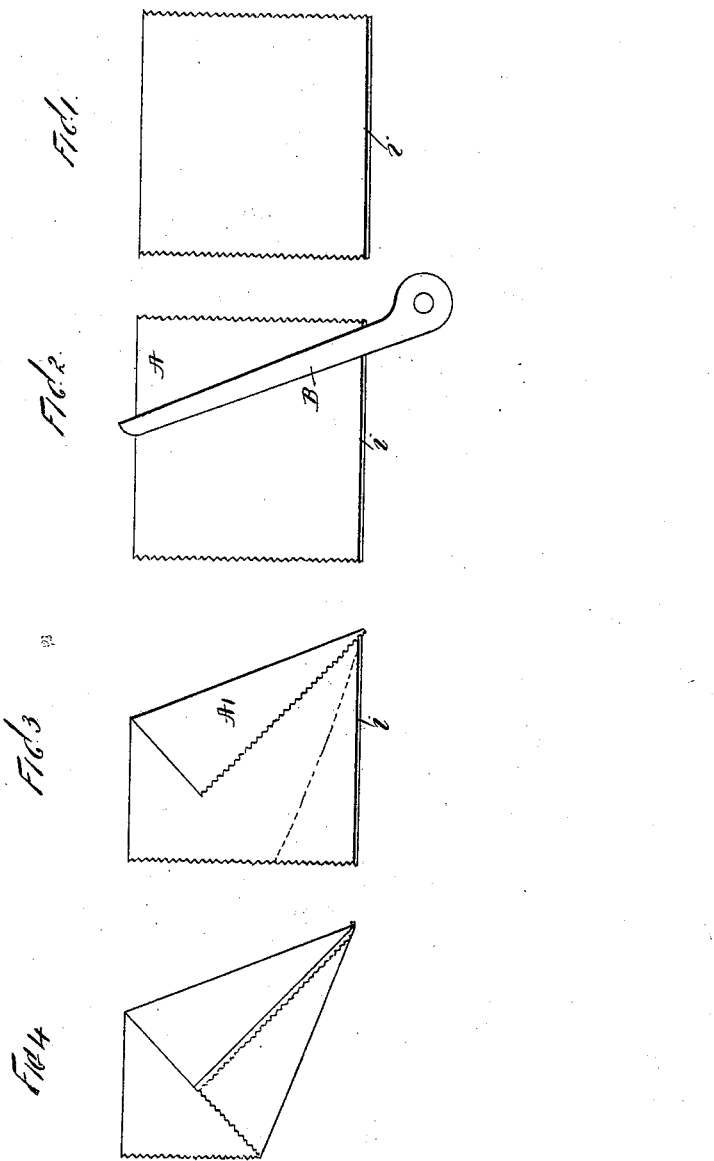
WITNESSES:
INVENTOR
George O. Woolley
BY
ATTORNEY No. 621,009. Patented Mar. 14, 1899.
G. O. WOOLLEY.
MANUFACTURE OF CONICAL SHAPED PAPER BAGS.
(Application filed Dec. 30, 1897.)
(No Model.) 8 Sheets—Sheet 2.
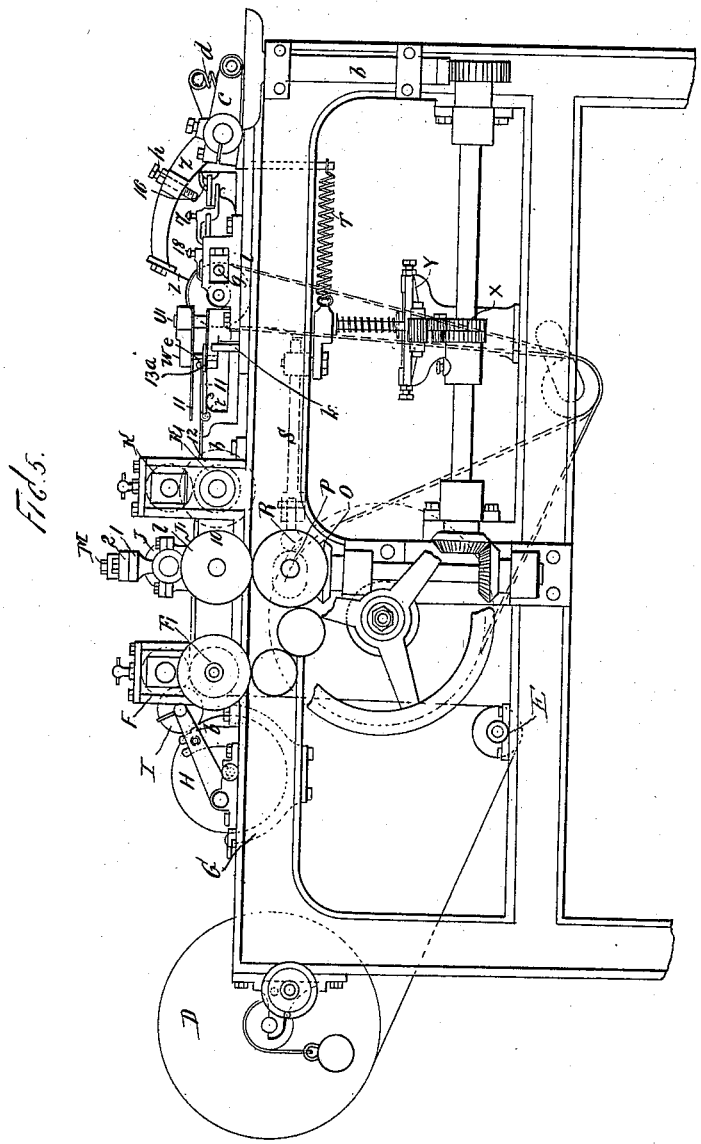
WITNESSES:
INVENTOR
George O. Woolley
BY
ATTORNEYS No. 621,009. Patented Mar. 14, 1899.
G. O. WOOLLEY.
MANUFACTURE OF CONICAL SHAPED PAPER BAGS.
(Application filed Dec. 30, 1897.)
(No Model.) 8 Sheets—Sheet 3.
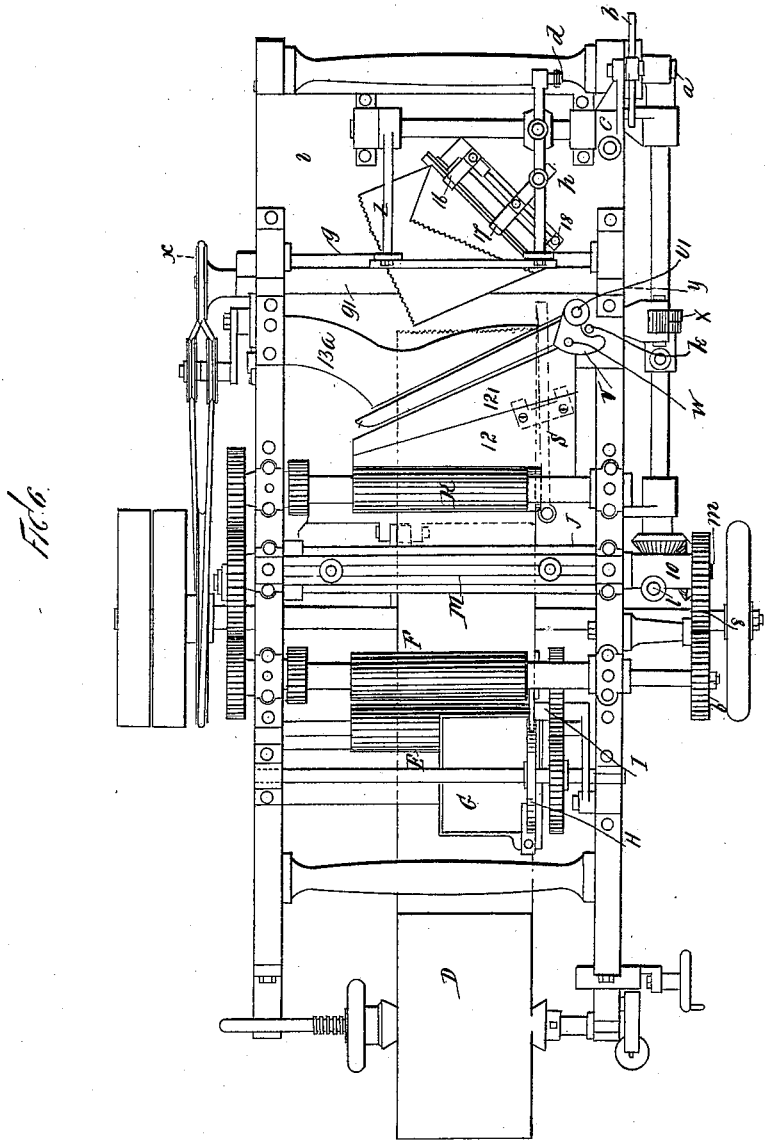
WITNESSES:
INVENTOR
George O. Woolley
BY
ATTORNEYS No. 621,009. Patented Mar. 14, 1899.
G. O. WOOLLEY.
MANUFACTURE OF CONICAL SHAPED PAPER BAGS.
(Application filed Dec. 30, 1897.)
(No Model.) 8 Sheets—Sheet 4.
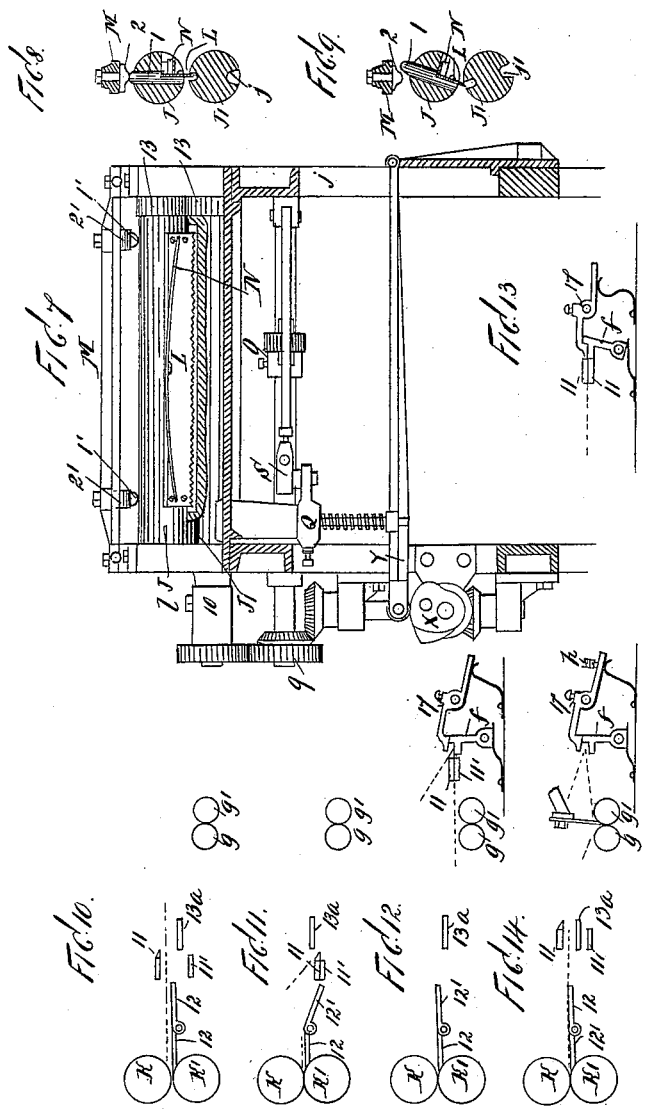
WITNESSES: INVENTOR
George O. Woolley,
BY
ATTORNEYS.

No. 621,009. Patented Mar. 14, 1899.
G. O. WOOLLEY.
MANUFACTURE OF CONICAL SHAPED PAPER BAGS.
(Application filed Dec. 30, 1897.)
(No Model.) 8 Sheets—Sheet 5.
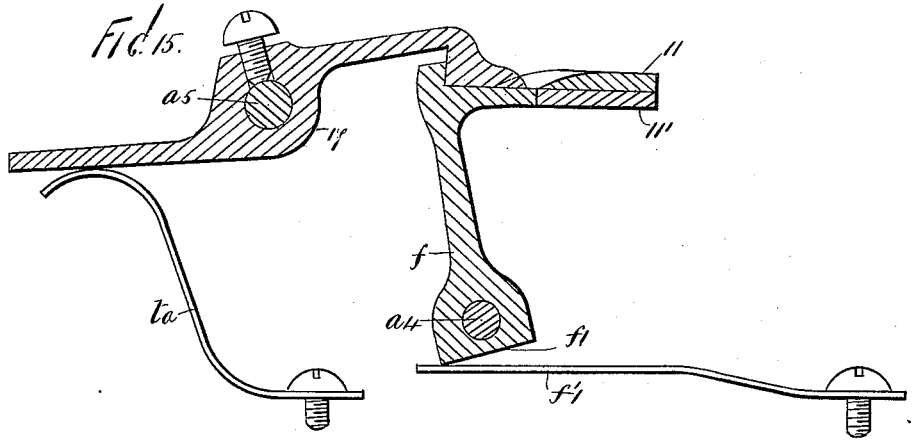
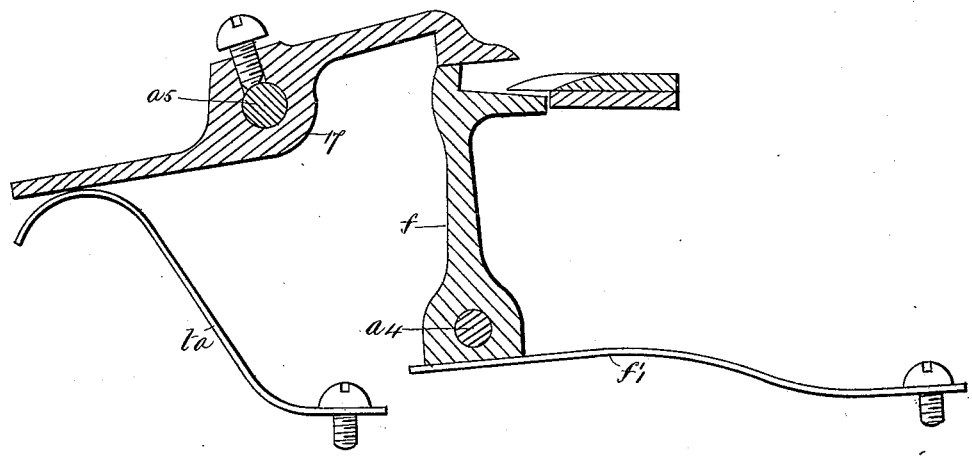
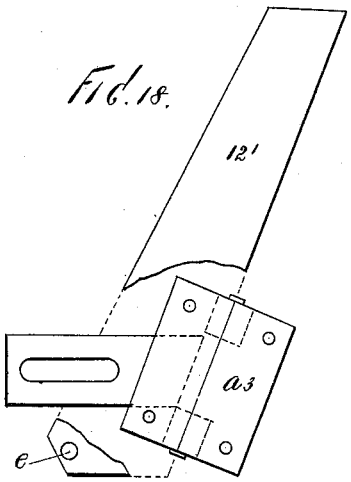
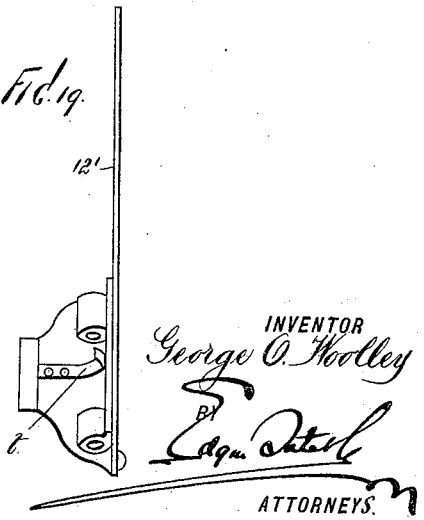
WITNESS
INVENTOR George O. Woolley
ATTORNEYS.

No. 621,009. Patented Mar. 14, 1899.
G. O. WOOLLEY.
MANUFACTURE OF CONICAL SHAPED PAPER BAGS.
(Application filed Dec. 30, 1897.)
(No Model.) 8 Sheets—Sheet 6.
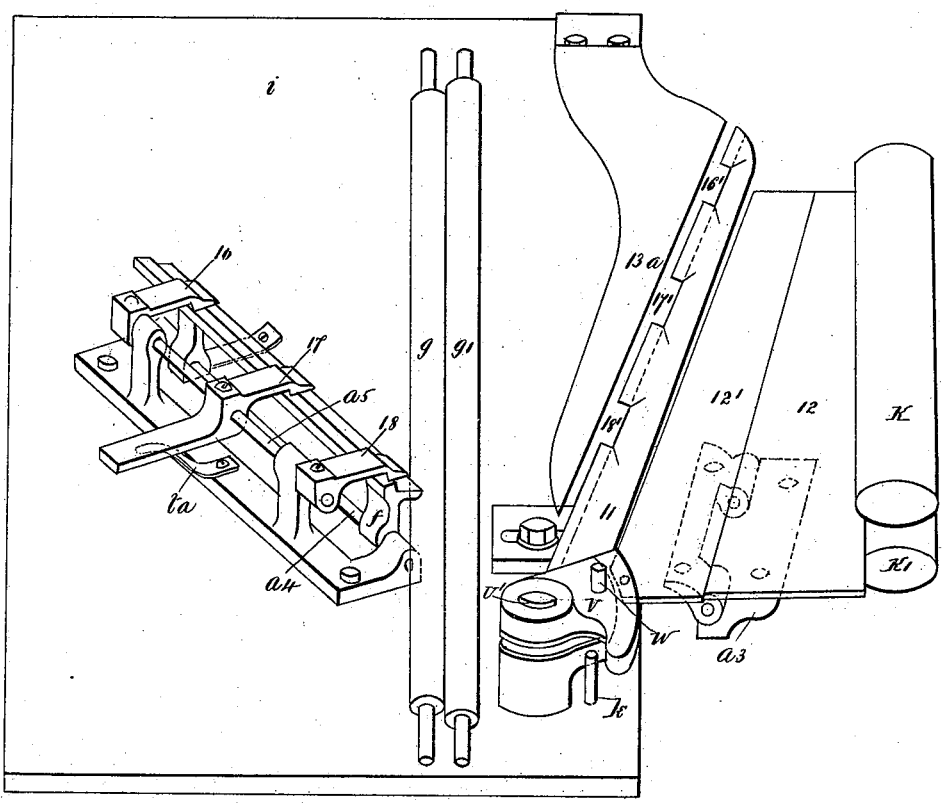
WITNESS
INVENTOR
George O. Woolley
BY
ATTORNEYS

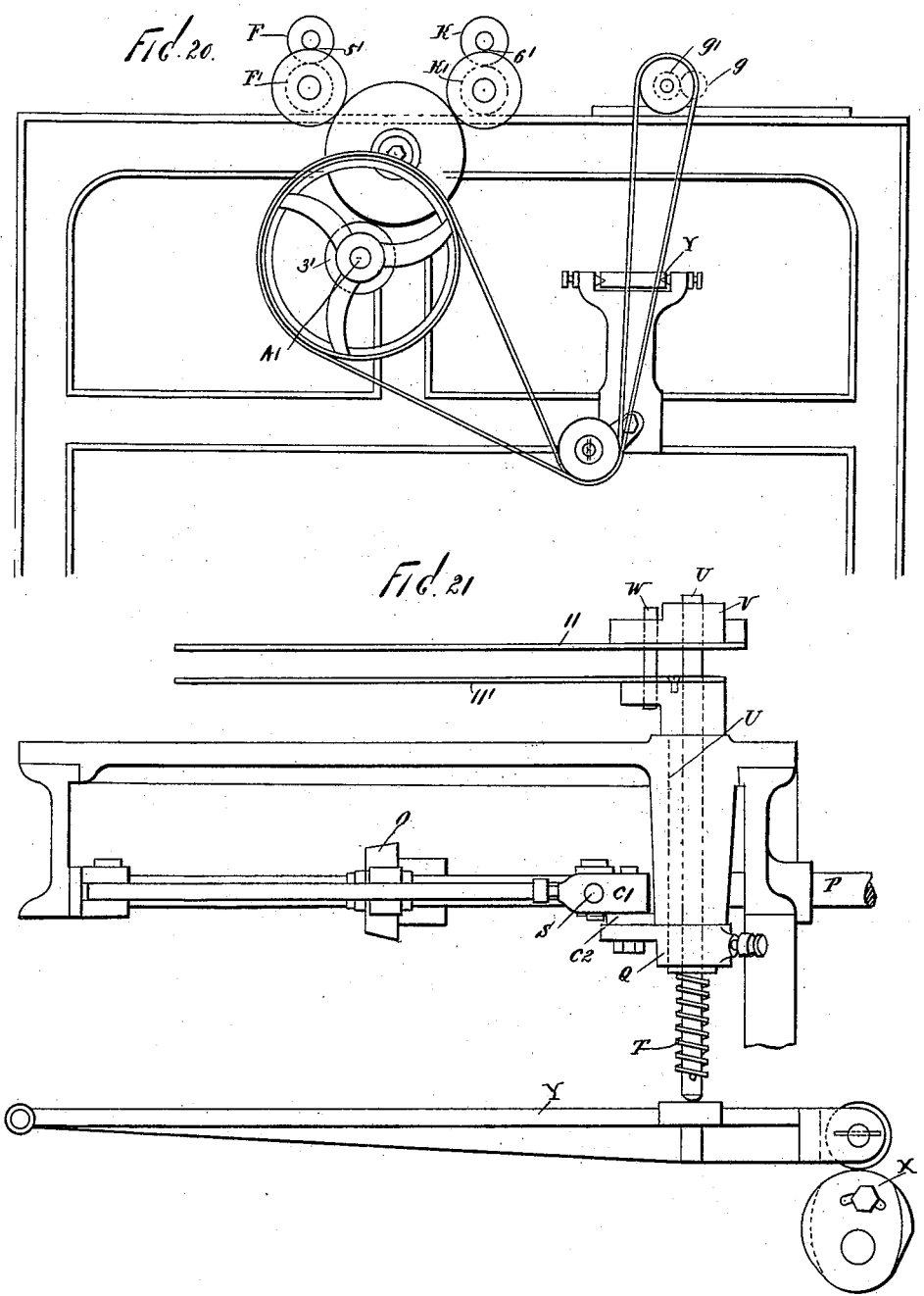

No. 621,009. Patented Mar. 14, 1899.
G. O. WOOLLEY.
MANUFACTURE OF CONICAL SHAPED PAPER BAGS.
(Application filed Dec. 30, 1897.)
(No Model.) 8 Sheets—Sheet 8.
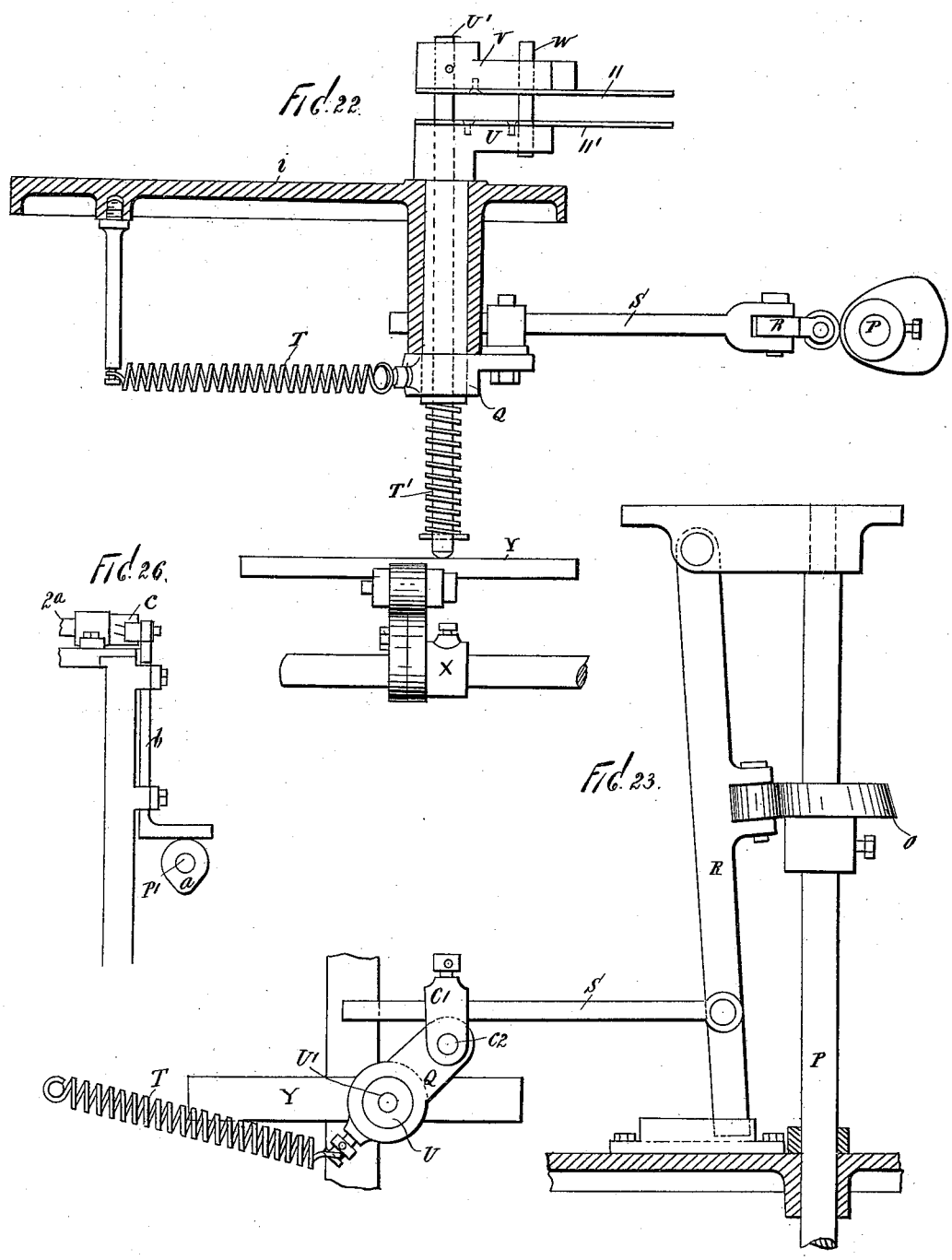

UNITED STATES PATENT OFFICE.

GEORGE ORLANDO WOOLLEY, OF NEAR COLLEGE GREEN, COUNTY OF BRISTOL, ENGLAND.

MANUFACTURE OF CONICAL-SHAPED PAPER BAGS.

SPECIFICATION forming part of Letters Patent No. 621,009, dated March 14, 1899.

Application filed December 30, 1897. Serial No. 664,501. (No model.)

*To all whom it may concern:*

Be it known that I, GEORGE ORLANDO WOOLLEY, a citizen of the Kingdom of Great Britain and Ireland, residing at 61 St. George's road, near College Green, in the county of Bristol, England, have invented certain new and useful Improvements in Machines for the Manufacture of Conical-Shaped Paper Bags, of which the following is a full and complete specification, such as will enable those skilled in the art to which it appertains to make and use the same.

This invention relates to machines for the manufacture of conical-shaped or cap-shaped paper bags, such as are known to the trade in England as "sweet" bags; and it has for its object to provide improvements in a machine of this character whereby bags of this class having a particular preferred shape when folded can be conveniently and economically manufactured.

The invention is the same as that for which Letters Patent were granted in Great Britain August 11, 1896, No. 17,754, and is fully disclosed in the following specification, of which the accompanying drawings form a part, in which—

Figure 1 is a plan view of a blank sheet of paper as severed for the manufacture of the bag, showing the line of paste. Fig. 2 is a plan view illustrating the position at which the blades seize the sheet. Fig. 3 is a plan view showing the condition in which the partially-folded sheet is delivered to the grippers. Fig. 4 is a plan view of a finished bag. Fig. 5 is a front elevation of a machine constructed in accordance with my invention. Fig. 6 is a plan view of the machine. Fig. 7 is a transverse sectional view through the machine, some of the parts which are clearly shown in the other views being omitted for the purpose of clearness. Fig. 8 is a transverse section through the cutting-rolls, showing their position at the moment of severance of the paper. Fig. 9 is a section through the cutting-rolls, showing their position when the sliding pins are approaching the lugs. Figs. 10, 11, 12, 13, and 14 are diagrammatic views illustrating the manner of performing the respective folding operations; and Figs. 15 and 16 represent enlarged sectional views of the grippers I employ and showing in what manner they operate. Fig. 17 is an isometrical view showing the arrangement of the various parts used in making the first fold of the bag. Fig. 18 is a plan view of a hinged bracket which forms a part of the construction and showing other parts connected therewith. Fig. 19 is an end view of the same. Fig. 20 represents a back elevation of a part of the apparatus. Fig. 21 represents a transverse sectional view of the table of the machine and showing parts of the apparatus connected therewith. Figs. 22, 23, 24, and 25 represent details of the apparatus, part of the construction being in section.

Referring to Fig. 5, D represents a reel of paper from which it is assumed the bags are subsequently to be made. From the reel the paper is led underneath the roller E and from thence to the feed-rolls F and F'. G is a box or trough of paste in which revolves the disk H. I is a smaller disk and so adjusted that it receives a continuous supply of paste from the disk H and conveys it to the margin of the paper as the paper passes underneath the said disk I. The position of the line of paste thus laid is shown in Fig. 1 by the thick black line. The rolls F and F' draw the paper from the reel and pass it onward between the second pair or cutting-rolls J and J' and onto the traversing rolls K and K'. The feed-rolls F and F' and the traversing rolls K and K' are all of the same diameter, each pair being geared together in the usual way with spur-wheels of equal number of teeth, and are driven at a uniform and constant rate of speed by the spur-wheels represented by the circles 3', 4', 5', and 6', Fig. 20, the function of the said rolls being to convey the paper passing between them at a uniform and regular speed at all times.

Fig. 8 represents the cutting-rolls, and they are so arranged in suitable bearings that they are far enough apart to allow the paper to pass freely between them. The upper roll J has the two sliding pins 1 and 1' fitted to two corresponding holes provided, and to them are attached the serrated knife L. In the lower roll J' and opposite the serrated knife L is a corresponding slot or groove, and by means of the spur-wheels 13 and 13', Fig. 7, the two cutting-rolls revolve simultaneously when actuated by the change-wheel represented by the circle 6, Fig. 5, through the intermediate spur-wheels represented by the circles 7, 8, 9, and 10.

The pins 1 and 1' project beyond the roll and are shaped, as shown, so that at each revolution of the rolls their beveled ends meet the lugs 2 and 2', fixed in the bar M above, and by them the pins are pushed downward through the holes, carrying with them the serrated knife L, whereby the paper is pierced and severed. Two pockets are provided in the lower roll to allow the projecting ends of the pins to clear when in that position. The spring N brings the serrated knife back to its normal position after the pins 1 and 1' have passed the lugs 2 and 2'.

The cutting-rolls and the folding mechanism are both actuated by the change-wheel 6, Fig. 5, and by suitable gearing the shafts M, P, and P' revolve simultaneously. Smaller or larger sizes of bags are made by substituting a change-wheel of greater or less number of teeth, as required. The sheet being cut off, it is passed on by the traversing rolls K and K'. I would here observe that instead of the severing arrangement just described I may use any other suitable means to obtain the same result without prejudice to my patent, the essential part of my invention being the process of forming the bag from the severed sheet of paper.

I will now describe in what manner the folding mechanism is actuated.

Referring to Figs. 21, 22, and 23, O is a cam fastened to the shaft P, and by the revolution of the said shaft a reciprocating motion is imparted to the lever Q through the medium of the lever R and adjustable connecting-rod S, the return stroke being effected by the spring T. The hollow sleeve U has fastened to its lower end the lever Q and to its upper extremity the blade 11'. To the hollow of the sleeve U is fitted the spindle U', to the upper end of which is fastened the boss V and to it the blade 11. The pin W, which is fitted tightly to a hole in the top of the sleeve U and a working fit in the hole in the boss V, serves to keep the upper blade 11 in its proper position above the lower blade 11', at the same time allowing a vertical movement to be imparted to the spindle U' by the revolution of the cam X through the lever V. The spring T' insures that the spindle U' follows the vertical movement of that part of the lever V upon which it bears. The cam X is made in two parts, adjustable so that the opening and closing of the blades, caused by the rising and falling of the vertical spindle U', may be timed with accuracy.

Referring to Fig. 24, C' is a clip fitted with a set-screw or other device, so that it may be readily fixed at any place along the connecting-rod S. It is also provided with a hole, to which is fitted the pin $C^2$, which is fastened to the lever Q. Thus the connection between the two points $C^2$ and $C^3$ may be adjusted so that the arc of a circle through which the folding-blades move may be located so as to coöperate with the set of grippers in the manner to be hereinafter described.

Referring to Fig. 25, at 16', 17', and 18' are shown the recesses or spaces in the top blade 11 and corresponding in position to the position of the grippers. The front edge of the top blade 11 is set forward beyond the lower blade a distance equal to the depth of the recesses aforesaid, the object being to allow the grippers to close upon the paper when they shut. Thereby the partly-folded sheet is effectually held in place, while the folding-blades are free to withdraw.

Referring to Figs. 5 and 6, the levers Z and Z, carrying the dipping-blade Z', receive an intermittent motion from the cam $a$ through the medium of the sliding bar $b$, the lever $c$, and the rocking shaft $2^a$, to which the levers Z and Z are affixed, the return stroke being effected by the spring $d$. From the traversing rolls the sheet, which is represented in Figs. 10, 11, 12, 13, and 14 by the dotted line, is conducted by the plates 12 and 12' over the fixed arm $13^a$ and between the folding-blades 11 and 11', and at the moment it is liberated from the rolls K and K' the sheet is seized by the closing of the blade 11 upon the blade 11', as shown in Fig. 11, the blades being then at the end of their stroke nearest the traversing rolls. At the same time the plate 12' is brought to the position shown in Fig. 11 by the lowering of the boss V, Fig. 22, upon the knob $e$. This knob is shown more clearly in Fig. 19. The object of this is to prevent the pasted margin of the paper from coming in contact with the fixed arm $13^a$ in its passage under the said arm, which would otherwise occur if the plate 12' remained in the position as in Fig. 10. The folding-blades then pass underneath the arm $13^a$. That part of the sheet in advance of the folding-blades is thereby turned back over the top blade. The blades 11 and 11' continue their passage forward to the other extremity of their stroke. Just before they arrive there, however, the lower blade comes in contact with the lower gripper $f$, which then moves with the blade to the end of the stroke thereof.

I will now describe the grippers, which are provided to receive the partly-folded sheet from the folding-blades.

Referring to Fig. 17, $a^4$ and $a^5$ are two spindles mounted in suitable bearings. To the spindle $a^5$ is attached, by set-screws or otherwise, the upper grippers 16, 17, and 18 and placed at intervals corresponding to the spaces 16', 17', and 18' in the top folding-blade 11. The part $f$ or lower gripper is fitted to the spindle $a^4$ so that it is free to respond to the upward action of the spring $f'$ upon the flat $f'$. Its normal position, therefore, will be as shown in Fig. 16. When in this position, the upper grippers 16, 17, and 18 rest on the ridge or step of the lower grippers, as shown.

Thereby they are kept open until the lower gripper $f$ is moved to the position as in Fig. 15 by the blade 11'. The upper grippers then are enabled to close upon the lower gripper, as in Fig. 13, by the upward action of the spring $t^a$, thereby effectually holding the partly-folded sheet delivered by the folding-blade 11. The lower gripper $f$ is prevented from regaining its normal position by the ridge aforesaid until released by the rising of the upper grippers. Fig. 16 shows the lower blade 11' just on the point of meeting the gripper, and Fig. 15 shows the blades at their destination. The partially-folded sheet is held by the gripper while the blades 11 and 11' separate slightly by the action of the cam X. The blades then return, the top one lifting enough when at the position shown in Fig. 14 to enable the paper as it advances to pass freely under it. Fig. 14 shows the creasing-blade Z' descending in order that the sheet may be made to enter the creasing-rolls $g$ and $g'$, which revolve in the directions indicated by the arrows, at the same time the screw $h$, which is attached to the arm Z, descending on the gripper 17, as shown. By adjusting the aforesaid screw the top grippers are made to open sufficient to allow the bottom gripper to spring forward to its normal position by the action of the spring $f'^1$. The sheet is thus liberated, and by its passage through the creasing-rolls the pasted margin of the sheet is pressed upon the margin of the fold first formed. Thereby the seam is firmly cemented along its entire length. The bag is then completed. The plate 12' returns to its normal position by the action of the spring shown at $t$, Figs. 19 and 20. The process just described is repeated for each bag made. The machine may be set to make bags of various sizes, and when it is desired to alter it from one size to another a change-wheel of suitable size must be substituted for the wheel 6. The table $i$ may now be moved along to its proper position on the frame $j$ and secured there by any suitable means. The rod S, connecting the two levers Q and R, may now be adjusted to the correct length in the manner hereinbefore mentioned, the cam O being then in the position as shown in Fig. 22, and the top of the sleeve carrying the lower folding-blade 11' is back at the stop $k$ provided. A plate of suitable size is then substituted for the one at 12', Fig. 17. The wheel 10, which actuates the cutting-rolls, is provided with a split boss and tightening-screw, so that it may be locked at any part of the revolution about the spindle $m$ of the cutting-rolls. By means of this arrangement the relative positions of the wheel 10 and the cutting-roll J' may be so altered and adjusted that the severed edge of the paper may be immediately between the traversing rolls K and K' at the moment the sheet is seized by the folding-blades 11 and 11'.

I do not desire to be understood as limiting myself to the exact details of construction and arrangement as herein shown and described, as numerous manifest variations and modifications may be resorted to, and I therefore reserve the right to all such variations and modifications in the construction and arrangement as properly fall within the spirit and scope of my invention and the terms of the following claims.

Having fully described my invention, I claim as new and desire to secure by Letters Patent—

1. In a machine for the manufacture of conical-shaped paper bags, a reciprocating device for seizing the blank sheet of paper and forming the first fold during the passage of the reciprocating device through an arc of a circle and means for actuating said reciprocating device in said movement through an arc of a circle, substantially as and for the purpose set forth.

2. In a machine for the manufacture of conical-shaped paper bags, a reciprocating device comprising folding-blades between which the blank sheet of paper is adapted to be seized, means for operating said blades in their folding movement, and means for swinging said blades through an arc of a circle during which passage through an arc of a circle the first fold is formed in the blank sheet of paper, substantially as and for the purpose set forth.

3. In a machine for the manufacture of conical-shaped paper bags, a reciprocating device comprising folding-blades between which the blank sheet of paper is adapted to be seized, means for operating said blades in their folding movement, means for reciprocating said blades through an arc of a circle, and devices operating with respect to said blades to form the first fold in the blank sheet of paper during the passage of the blades through said arc of a circle, substantially as and for the purpose set forth.

4. In a machine for the manufacture of conical-shaped paper bags, a reciprocating device comprising folding-blades between which the blank sheet of paper is adapted to be seized, and means for swinging said blades through an arc of a circle, substantially as and for the purpose set forth.

5. In a machine for the manufacture of conical-shaped paper bags, a reciprocating device operating through an arc of a circle and adapted to seize and form the first fold in the blank sheet of paper during its passage through said arc of a circle, substantially as and for the purpose set forth.

6. In a machine for the manufacture of conical-shaped paper bags, the combination, with gripper mechanism adapted to receive and retain the sheet of paper after the first fold has been formed therein, of a reciprocating device adapted to seize the blank sheet of paper and carry the same to the gripper mechanism, the first fold in the blank sheet of paper being formed during the passage of the reciprocating device, substantially as and for the purpose set forth.

7. In a machine for the manufacture of conical-shaped paper bags, a reciprocating device operating through an arc of a circle and adapted to seize the blank sheet of paper and form the first fold during its passage through said arc of a circle, in combination with a gripper mechanism to which the sheet thus folded is delivered, substantially as and for the purpose set forth.

8. A machine for the manufacture of conical-shaped paper bags, comprising a reciprocating device adapted to seize the blank sheet of paper and form the first fold during the passage of said reciprocating device through an arc of a circle, means for operating said reciprocating device through an arc of a circle, gripper mechanism for receiving the sheet thus folded from the reciprocating device at the terminus of the movement of the latter, and mechanism for forming the next fold while the sheet of paper is held by the gripper mechanism, substantially as and for the purpose set forth.

9. In a machine for the manufacture of conical-shaped paper bags, a reciprocating device comprising folding-blades between which the blank sheet of paper is adapted to be seized, means for operating said blades in their folding movement, means for swinging said blades through an arc of a circle, and means for forming the first fold in the blank sheet of paper during the passage of the blades through an arc of a circle, in combination with gripper mechanism arranged with relation to the terminus of the movement of the reciprocating device and adapted to receive the sheet of paper thus folded therefrom, substantially as and for the purpose set forth.

10. In a machine for the manufacture of conical-shaped paper bags, a gripper mechanism receiving the sheet of paper after the first fold is formed therein and operating to retain the same in position for the formation of the second fold, substantially as and for the purpose set forth.

In testimony that I claim the foregoing as my invention I have signed my name, in presence of the subscribing witnesses, this 2d day of December, 1897.

GEORGE ORLANDO WOOLLEY.

Witnesses:
GILBERT JOHN WHITE,
MAYO THOMAS EDWARD.